United States Patent Office.

WLADYSLAW T. KOSINSKI, OF BROOKLYN, NEW YORK.

Letters Patent No. 61,648, dated January 29, 1867.

---

CEMENT FELT FOR COVERING STEAM BOILERS, PIPES, &c.

---

*The Schedule referred to in these Letters Patent and making part of the same.*

---

TO ALL WHOM IT MAY CONCERN:

Be it known that I, WLADYSLAW T. KOSINSKI, of the city of Brooklyn, county of Kings, and State of New York, have invented a new and useful manufacture, consisting of a composition of matter in the nature of a plaster cement, and which I have named "Boiler Cement Felting;" and I do hereby declare the following to be a full, clear, and exact description thereof, and such as will enable any one skilled in the arts to which this invention appertains to make and use said composition.

The object of my invention is to produce a porous, plastic, elastic, and non-conducting composition suitable for covering the surface or surfaces of any body wherein it is desirable to maintain an even or uniform temperature, or to bodies wherein it may be desirable to retain, or from which it may be desirable to exclude the heat, such as steam pipes or boilers, hot or cold-water pipes, tanks, vats, furnaces, and indeed all sorts of apparatus where any of the aforementioned objects may be of any importance.

The ingredients or elements employed in compounding my said cement felting are ground charcoal, molasses, alum, pitch or tar, and animal hair. These constituents I unite or mix together in about the following proportions: ground charcoal, sixteen parts; alum, two parts; pitch or tar, four parts; molasses, eight parts; animal hair, two parts, all by weight. The proportions may be somewhat varied without materially altering the result, and perhaps further experience may show a modification of the proportions here given to be advantageous, but thus far I have found the proportions here given to give very good satisfaction, where the purpose is to cover heated surfaces or bodies wherein heat is to be retained. And in compounding this cement, saw-dust may be substituted for ground charcoal, or charcoal and saw-dust mixed, or paper, pulp, peat, or any similar substances, be used as a substitute for either; but when either of these substances is used, it should be in about the proportion above given. And a solution of water and gum arabic, British gum, dextrine, or any other gum, made in about the consistency of molasses or paste, or a solution of water and glue, or starch, or any other saccharine, gelatinous, or glutinous substance, made of the consistency aforesaid, which will serve as a vehicle to carry the other elements and stick them together, may be used as a substitute for molasses. And in the place of hair, some other fibrous substances may be used, such as jute, or indeed any strong fibre which will aid in holding the cement together and give it a felty, fibrous nature; but the hair or other fibrous substance may be omitted. I prefer to use it, though I do not deem its use absolutely necessary in cases where the composition is to be applied to cold surfaces. But when any of the foregoing substances are used, the proportion should be about the same as those given in the above formula. The cement thus made and compounded is more especially applicable to the covering of steam boilers or steam pipes or other hot bodies where the object is to avoid radiation of heat, and thus to economize in the consumption of fuel. In making this compound, it is best to make a strong solution of water and alum, and mix the ground charcoal or saw-dust with it, and then dry it before mixing in the molasses or other sticky matter. But a very good result may be obtained by mixing the ground alum with the charcoal, saw-dust, or their substitutes, dry, introducing the molasses or its substitutes afterwards. After the cement has been thus prepared, it is applied to the surface as a paste or plaster, and then covered with a thin cloth, canvas, or felt. The heat of the boiler or other body then bakes or dries the cement in a compact mass upon the surface of the body covered. When the composition is to be used to cover a cold surface, such as cold-water pipes, refrigerators, and the like, it should be compounded substantially as above stated, using, however, for this purpose, if preferred, ground pitch, resin, or asphaltum, heated with the charcoal or saw-dust or its substitute, thoroughly mixing them together, and afterwards mixing in the molasses, gummy or sticky substances, omitting the hair; then putting the cement into moulds, baking or drying it into the form required for use.

Having now described the nature and extent of my invention, I claim, and desire to secure by Letters Patent—

The new article of manufacture, consisting of a plastic cement compounded of the materials or ingredients, and in the manner substantially as described, and suitable for covering steam pipes, boilers, hot and cold-water pipes, refrigerators, etc.

WLADYSLAW T. KOSINSKI.

Witnesses:
AMOS BROADNAX,
EDWARD P. FLINT.